(12) United States Patent
Flegel

(10) Patent No.: US 9,343,925 B1
(45) Date of Patent: May 17, 2016

(54) SYSTEM FOR DISTRIBUTING POWER FROM MULTIPLE POWER SOURCES TO INDIVIDUAL LOADS CONNECTED TO A DISTRIBUTION PANEL ASSEMBLY

(75) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 813 days.

(21) Appl. No.: 13/587,281

(22) Filed: Aug. 16, 2012

Related U.S. Application Data

(60) Provisional application No. 61/523,934, filed on Aug. 16, 2011.

(51) Int. Cl.
*H02J 9/00* (2006.01)
(52) U.S. Cl.
CPC ........................................ *H02J 9/00* (2013.01)
(58) Field of Classification Search
CPC ............ H02H 1/00; H02H 3/00; H02H 5/00; H02H 6/00; H02H 7/00; H02H 7/22; H02H 9/00; H02H 11/00; H02J 11/00; H02J 3/00; H02J 9/002; H02J 9/04
USPC .......................................................... 307/112
See application file for complete search history.

(56) References Cited

U.S. PATENT DOCUMENTS

| | | | | |
|---|---|---|---|---|
| 5,347,609 A * | 9/1994 | Huff | ............................. | 392/309 |
| 5,761,027 A * | 6/1998 | Flegel | ............................ | 361/664 |
| 6,570,269 B2 * | 5/2003 | McMillan et al. | ............... | 307/64 |
| 6,747,369 B2 * | 6/2004 | Griffith | ................... | H02J 1/102 |
| | | | | 307/43 |
| 7,017,059 B2 * | 3/2006 | Law et al. | ...................... | 713/322 |
| 7,119,457 B1 * | 10/2006 | Flegel | ........................ | H02J 3/14 |
| | | | | 307/64 |
| 7,462,791 B1 * | 12/2008 | Flegel | ....................... | H01H 9/26 |
| | | | | 200/50.32 |
| 7,599,171 B1 * | 10/2009 | Remmert | ...................... | 361/631 |
| 7,692,332 B2 * | 4/2010 | Nordman | .................. | H02G 3/08 |
| | | | | 307/146 |
| 7,737,579 B1 * | 6/2010 | Czarnecki | ................ | H01H 9/26 |
| | | | | 307/64 |
| 8,030,799 B1 * | 10/2011 | Flegel | ............................. | 307/64 |
| 8,098,465 B1 * | 1/2012 | Flegel | ............................. | 361/42 |
| 8,350,405 B2 * | 1/2013 | Vicari et al. | .................... | 307/23 |
| 8,569,912 B2 * | 10/2013 | Lim | ......................... | H02N 1/24 |
| | | | | 307/38 |
| 2002/0067277 A1 * | 6/2002 | Nishimura et al. | ........... | 340/635 |
| 2003/0042794 A1 * | 3/2003 | Jarrett | ....................... | H02J 9/06 |
| | | | | 307/23 |
| 2004/0134533 A1 * | 7/2004 | Cowan | .......................... | 137/209 |
| 2006/0072262 A1 * | 4/2006 | Paik et al. | ........................ | 361/62 |
| 2006/0250759 A1 * | 11/2006 | Gull et al. | ...................... | 361/601 |
| 2009/0084664 A1 * | 4/2009 | Flegel | ........................ | 200/50.32 |
| 2009/0212630 A1 * | 8/2009 | Flegel et al. | .................... | 307/64 |

* cited by examiner

*Primary Examiner* — Jared Fureman
*Assistant Examiner* — Michael Warmflash
(74) *Attorney, Agent, or Firm* — Boyle Fredrickson, S.C.

(57) ABSTRACT

An electrical power distribution apparatus that is configured to selectively communicate power from alternate power sources to one or more loads in a manner that maintains isolation of the input power derived from the alternate sources. The electrical power distribution apparatus includes a neutral input for connecting to a neutral output of the auxiliary power supply and a ground conductor for connecting a ground conductor of the auxiliary power supply. The apparatus includes an electrical bus that receives electrical power from a first electrical output of the auxiliary power supply and unswitchably communicates the first electrical output to a breaker connected to a load.

17 Claims, 5 Drawing Sheets

SYSTEM FOR DISTRIBUTING POWER FROM MULTIPLE POWER SOURCES TO INDIVIDUAL LOADS CONNECTED TO A DISTRIBUTION PANEL ASSEMBLY

CROSS-REFERENCE TO RELATED APPLICATIONS

This application claims priority to U.S. provisional application Ser. No. 61/523,934, filed on Aug. 16, 2011 and titled "Auxiliary Power Distribution Panel", the entire contents of which are expressly incorporated herein.

BACKGROUND OF THE INVENTION

The present invention relates generally to power distribution systems and/or panels and, more particularly, to a power distribution system that can be configured to selectively communicate one of utility power or an uninterruptable power signal from an auxiliary power supply, such as an electric generator, to a common switch, breaker, or transfer switch breaker associated with communicating either of the utility supplied or auxiliary source supplied operating power to the load.

Many if not most buildings, regardless of use as a home, dwelling, business, or other use, are commonly powered by a primary power source such as a utility power supply. A number of electrical devices or loads, such as lights, computers, entertainment devices, pumps, fans, smoke detectors, refrigerators, equipment, etc. are fairly abundant regardless of the environment associated with the structure. Regardless of the number and/or type of load or intended use of the structure, certain loads are commonly deemed as more important or critical loads whereas others are commonly considered less important or non-critical loads. The critical loads for a home, for instance, may include the HVAC system, sump pumps, refrigerators, freezers, dishwashers, washers/dryers, and life-sustaining medical equipment. Non-critical or less important loads are commonly associated with those devices or systems that a user can tolerate extended periods of inoperability of the load in the event of an interruption to the electrical service associated with operation of the load. It is appreciated that the designation of a particular load as critical or non-critical can vary between different users and installations. As a general premise, critical loads are those loads that a particular user would prefer to be operable or powered at any given time regardless of the status of power being provided by a utility power source.

In order to ensure the availability to power to desired critical loads during a utility power or service outage, many users employ an auxiliary electrical power source. Some such supplemental power sources can include wind turbines, solar cells or collectors, battery storage, and/or engine powered generators, etc. Commonly the auxiliary power source is configured to power at least the desired critical loads associated with the particular electrical system so as to make utility power outages more tolerable, comfortable, and/or less costly due to property damage—such as caused by suspension of sump pump operations, and/or spoilage—which may be caused by extended periods of inoperability of refrigerators, freezers, and the like.

The critical and/or non-critical load designations must commonly be determined during the initial configuration of the electrical power distribution system. The non-critical loads are generally connected to non-critical branches that are hardwired to a main panel, breaker box, or main load center or simply load center. The critical loads are typically connected to critical branches that are hardwired to a separate subpanel, which is typically referred to as a transfer switch assembly or transfer panel, which can be remote or adjacent the load center but commonly include a number of switches or breakers associated with the respective loads desired to be powered by the auxiliary power source. For convenience, the transfer switch assembly or panel will hereafter be referred to as a transfer panel, with the understanding that such a designation applies to any device that is used to controls the supply of electrical power to a selected subset of electrical loads from two different power sources.

During normal primary power source operation, the loads associated with both the load center and the transfer panel are powered by the primary power source. To ensure power to the critical loads during primary power source failure, it is known to connect the transfer panel and, thus, the critical loads, to an auxiliary power source, such as an engine powered electrical generator. This connection of the transfer panel to the auxiliary power source may be done automatically when a failure or a suspension of power from the primary power source is detected. For instance, an automatic auxiliary power supply system can be configured to detect failure associated with the primary power source and configured to then automatically start operation of the auxiliary power source. Alternately, the electrical connection of the transfer panel to the auxiliary power supply can be done manually. In either instance, an electromechanical device or assembly ("transfer switch") is used to selectively connect the circuits of the transfer panel to either the utility power source or the auxiliary power source.

A conventional auxiliary power supply system includes a power inlet box that is typically mounted on an outside wall of the building. The power inlet box interfaces, e.g., via a plug, with a generator that is typically located outside of the building. The power inlet box in turn is connected to the transfer panel that includes a transfer switch and which includes a housing that contains the power supply input selector switch, as well as a series of circuit breaker-type switches, each of which is connected in a circuit containing one or more of the critical or desired loads within the building. In the event of a power outage, the switches corresponding to these circuits are actuated to enable the circuits to be powered by the generator. Commonly, such devices include a number of interlocks that effectuate a desired switching sequence to connect the desired loads to the utility or supplemental power sources while maintaining a desired electrical isolation between the utility power source and the auxiliary power source. Particularly in manually operated transfer switch systems, the user preferably has some degree of familiarity with the switching sequence so as to maintain the desired isolation between the utility and supplemental power sources.

Thus, it is desirable to provide a distribution panel assembly that can cooperate with a main panel system and which simplifies the operations associated with supplying operating power provided from alternate power sources to a load while maintaining isolation between the alternate power sources.

BRIEF DESCRIPTION OF THE INVENTION

The present invention contemplates a new distributional panel assembly that eliminates the need for a conventional transfer switch or panel. More particularly, the distribution panel has at least one bus bar that is hardwired or electrically connected to selected "transfer breakers" associated with the main panel or load center. Each transfer breaker is configured to receive power supply inputs from either of the utility power source or an auxiliary power source and provide an output to the desired load while maintaining isolation between the discrete inputs. The distribution panel further includes a neutral input for connecting to a neutral output of the auxiliary power supply and a ground conductor for connecting a ground conductor of the auxiliary power supply.

One aspect of the invention that is usable with one or more of the above aspects contemplates an electrical power distribution apparatus that is configured to selectively communicate power from alternate power sources to one or more loads in a manner that maintains isolation of the input power derived from the alternate sources. The electrical power distribution apparatus includes a neutral input for connecting to a neutral output of the auxiliary power supply and a ground conductor for connecting a ground conductor of the auxiliary power supply. The apparatus includes an electrical bus that receives electrical power from a first electrical output of the auxiliary power supply and unswitchably communicates the first electrical output to a breaker connected to a load.

Another aspect of the invention that is useable with one or more of the above aspects contemplates an electrical power distribution apparatus for connecting a load to one of a utility power supply and an auxiliary power supply and includes a neutral input for connecting to a neutral output of an auxiliary power supply. The power distribution apparatus includes a ground conductor for connecting a ground conductor of the auxiliary power supply and an electrical bus for receiving electrical power from a first electrical output of the auxiliary power supply and unswitchably connecting the first electrical output to a breaker connected to a load.

A further aspect of the invention that is usable with one or more of the aspects disclosed above contemplates a distribution panel for communicating power between a utility power source and an auxiliary power source and at least one load. The distribution panel includes an electrical power input for receiving electrical power from a utility power supply and a main electrical bus connected to the electrical power input. An auxiliary electrical bus receives electrical power from an auxiliary power supply, and a ground conductor connects a ground associated with the auxiliary power supply and a ground associated with the distribution panel. At least one transfer breaker has a first input that is connected to the main electrical bus and a second input that is connected to the auxiliary electrical bus. The distribution panel includes a power output that is connectable to an electrical load and means for selectively connecting the power output to either the first input or the second input.

Another aspect of the invention that is useable with one or more of the above aspects contemplates a kit for retrofitting a main electrical panel to selectively communicate power to a load from one of a utility power supply and an auxiliary power supply. The kit includes a first electrical bus for receiving electrical power from a first electrical output of the auxiliary power supply and a second electrical bus for receiving electrical power from a second electrical output of the auxiliary supply. Each of the first electrical bus and the second electrical bus are unswitchably connectable to a breaker associated with the main electrical panel, and each breaker is independently connectable to the utility power supply. The kit includes a neutral input for connecting to a neutral output of the auxiliary power supply and a ground conductor for connecting to a ground conductor of the auxiliary power supply.

Another aspect of the invention that is useable with one or more of the above aspects contemplates an electrical power distribution apparatus for use with an auxiliary power supply. The apparatus includes a first electrical bus for receiving electrical power from a first electrical output of the auxiliary power supply and a second electrical bus for receiving electrical power from a second electrical output of the auxiliary power supply. The first and second electrical buses are configured to unswitchably communicate electrical power to a breaker connected to both a load and to utility power. The apparatus includes a neutral input for connecting to a neutral output of the auxiliary power supply and a ground conductor for connecting to a ground conductor of the auxiliary power supply.

These and various other features and aspects of the present invention will be made apparent from the following detailed description and the drawings.

BRIEF DESCRIPTION OF THE DRAWING(S)

An exemplary embodiment of the subject matter disclosed herein is illustrated in the accompanying drawings in which like reference numerals represent like parts throughout, and in which.

Figure 1:
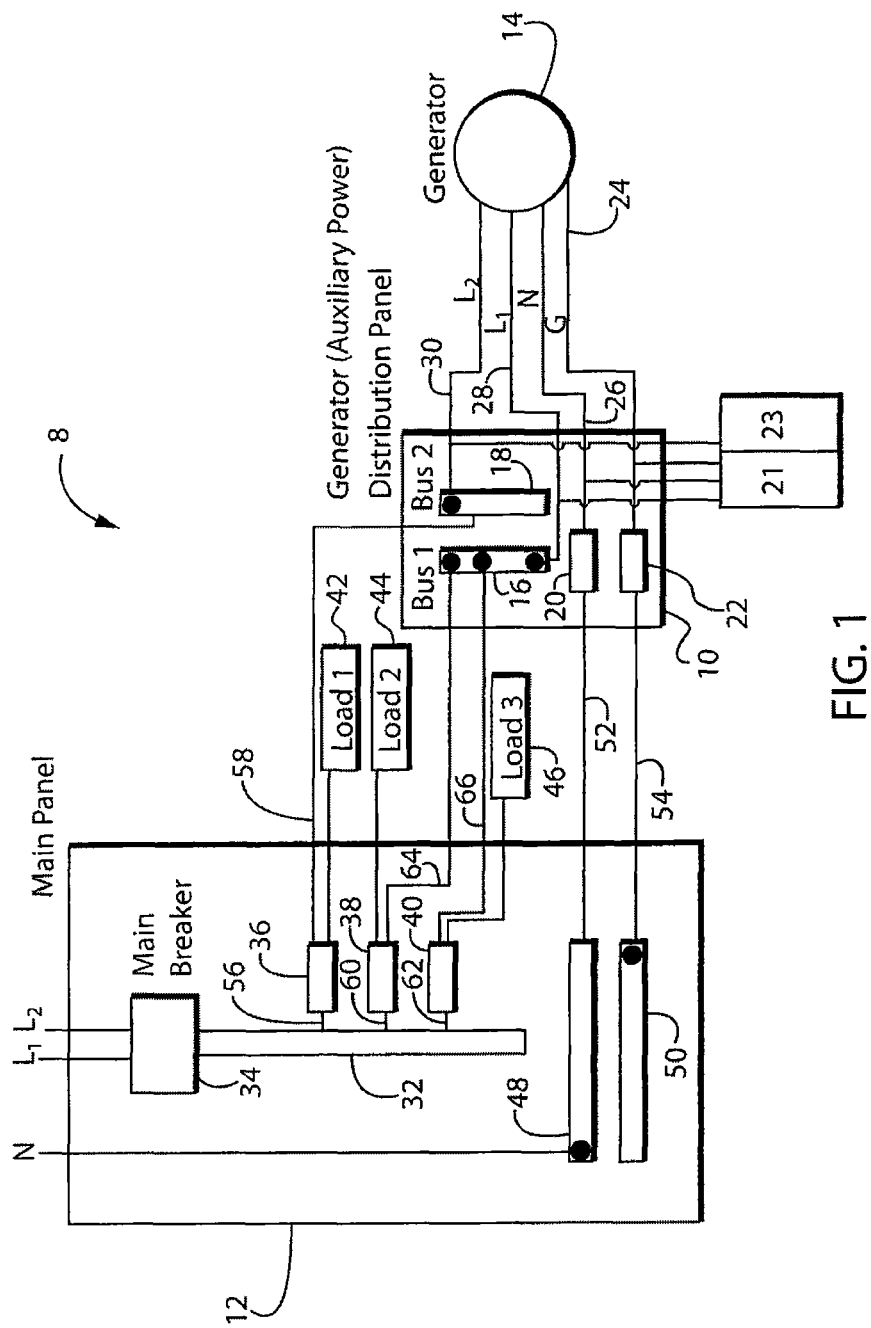
FIG. 1 is a schematic diagram of a representative embodiment of the present invention.

In describing the representative embodiment of the invention which is illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Referring to FIG. 1, an electrical power distribution apparatus or system 8 includes an auxiliary power distribution apparatus or panel 10 that provides an electrical power interface between a utility power or main panel 12 and an auxiliary power supply 14 such as an electric generator. Distribution panel 10 includes one or more electrical buses 16, 18, a neutral conductor 20, and a ground conductor 22. It is also contemplated that the distribution panel 10 may also be fitted with one or more meters 21 to measure the output associated with operation of electric generator 14 as well as accessories, such as a lamp 23, powered by the electric generator 14 when the electric generator 14 is feeding electrical power to the distribution panel 10. It is further appreciated that a power storage device, such as a battery, may also be provided to allow operation of lamp 23 when generator 14 is not in operation but visibility of distribution panel 10 during low ambient light condition is desired.

The ground conductor 22 is hardwired to a ground wire or conductor 24 associated with electric generator 14. In a similar manner, the neutral conductor 20 is wired to a neutral wire or conductor 26 associated with electric generator 14. As explained further below, the ground and neutral conductors associated with panel 10 can be connected to the respective ground and neutral conductor associated with main panel 12. Electrical generator 14 includes one or more "hot" outputs, as is known, with one of the outputs, e.g., $L_1$, wired to an electrical bus 16 of distribution panel 10 via a wire 28 and another or second output, e.g., $L_2$, wired to electrical bus 18 of distribution panel 10 via a wire 30. Alternately, it is appreciated that the electrical outputs of electric generator 14 may be connected to a plug (not shown) that removably but electrically cooperates in a known manner with a socket that is associated with a power inlet box (not shown) associated with distribution panel 10, as is also known in the art. In such a configuration, it is appreciated that electrical buses 16, 18 and conductors 20, 22 be hardwired to the power inlet box to complete the electrical connection with the electrical generator 14 in a manner that allows removal of the electrical generator from interaction with distribution panel 10. Such a connection is generally known in the art and need not be further described herein.

Still referring to FIG. 1, main panel 12 includes one or more electrical buses 32 that are can be connected to utility power from a utility-type power source through a main breaker 34. As is commonly understood, main breaker 34 is typically configured to isolate or allow electrical communication between main panel electrical buses 32 and the utility power source. Main panel 12 includes one or more switches, breakers, or transfer breakers 36, 38, and 40 that are interconnected between main panel electrical bus 32 and the "hot" conductors associated with discrete load circuits in which the transfer breakers 36, 38 and 40 are connected. As is commonly understood, loads 42, 44, 46 can also be connected to another "hot" conductor and one or more of a neutral bus or conductor 48 and a ground bus or conductor 50 associated with main panel 12. As explained further below, transfer breakers 36, 38 and 40 are also wired to at least one of the electrical buses 16, 18 associated with distribution panel 10. It is further appreciated that one or more of transfer breakers 36, 38, 40 can be connected to the neutral conductor 20 associated with distribution panel 10 for an application that require a switched neutral conductor.

As mentioned above, in addition to electrical bus(es) 32, main panel 12 includes a neutral conductor 48 and a ground conductor 50. In the illustrated embodiment, the main panel neutral conductor 48 and the distribution panel neutral conductor 20 are electrically connected to one another via a neutral wire 52. Similarly, main panel ground conductor 50 is electrically connected to the distribution panel ground conductor 22 via a ground wire 54. It will be appreciated that the configuration illustrated in FIG. 1 is for installations with a solidly connected neutral. As alluded to above, it is appreciated that distribution panel 10 can be configured for use with installations where it is desirable to switch the neutrals. For such an installation, the distribution panel 10 may include a neutral bus (not shown) with individual neutral wires (not shown) connected to the individual transfer breakers rather than being solidly connected to neutral conductor 20.

As should be appreciated from the description above, there is no switching activity that takes place in distribution panel 10. As such, the electrical connections between generator 14 and main panel breakers 36, 38, 40 are un-switchable in as much as there is no mechanism, short of disassembly of the respective electrical connections, to electrically isolate the various electrical connections associated with distribution panel 10 between generator 14 and main panel 12. Electrical buses 16, 18 are directly electrically connected to the respective transfer breakers 36, 38, 40 associated with the loads 42, 44, 46 intended to be powered by either of utility power associated with main panel 12 bus(es) 32 or auxiliary power source 14. Such a configuration is in direct contradiction to previously known transfer panel assemblies as such assemblies commonly include one or more switches or breakers associated with the critical loads intended to be powered by one of the respective power sources, i.e. utility or auxiliary power.

Figure 2:
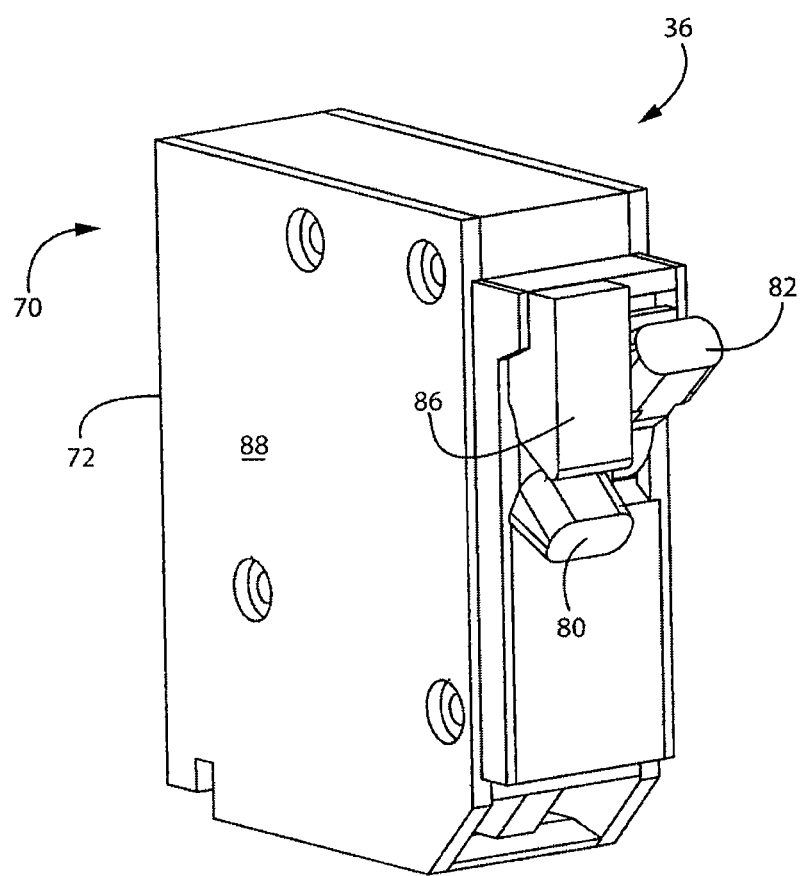
FIG. 2 is an isometric view of an exemplary individual circuit transfer switch associated with the present invention and which includes a pair of switch handles, and one embodiment of an interlock mechanism for controlling the power supply path through the individual circuit transfer switch, showing the switch handles and interlock mechanism in a first position.
Figure 3:
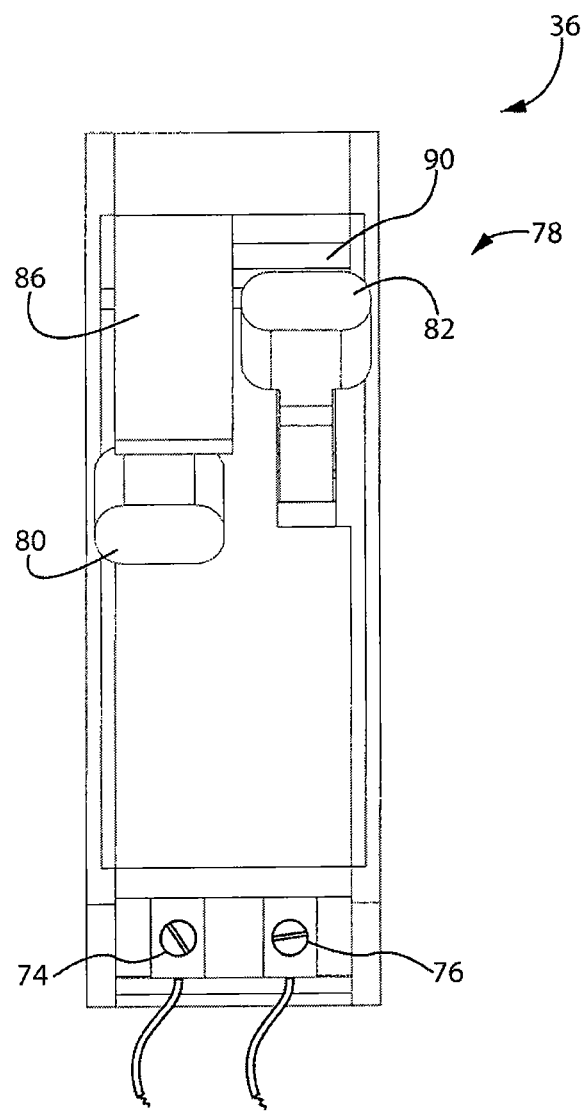
FIG. 3 is an isometric view of the transfer switch shown in FIG. 2 showing the switch handles and interlock mechanism in a second position.
Figure 4:
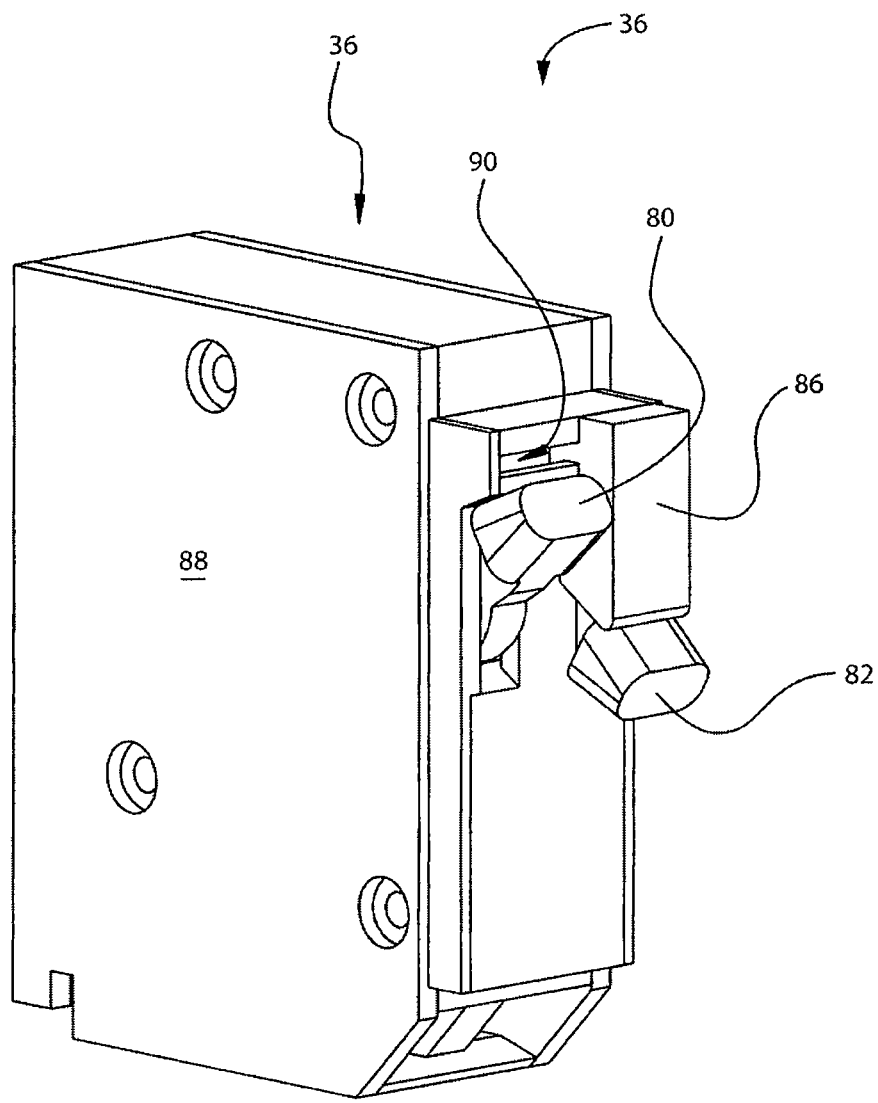
FIG. 4 is a front elevation view of the individual circuit transfer switch of FIG. 2.

FIGS. 2-4 show one of transfer breakers 36, 38, 40 removed from main panel 12. For brevity, the transfer breaker shown in FIGS. 2-4 will be referred to as transfer breaker 36 but it is appreciated that transfer breakers 38, 40 may have a similar or different construction provided such breakers are configured to provide similar operation. Other transfer breaker constructions and operations are more fully disclosed in Applicant's copending U.S. patent application Ser. No. 13/273,955, which claims priority to U.S. Provisional Patent Application Ser. No. 61/393,566, and the entire disclosures of which are incorporated herein.

As shown in FIGS. 2-4, exemplary transfer breaker or switch 36 may be sized to fit within a typical utility or main circuit breaker box or electrical panel, and may be configured to occupy the same amount of space as is normally occupied by a conventional circuit breaker. Each circuit transfer switch 36 may be rectangular in shape, although the shape and size of the switch 36 may vary depending upon the particular dimensions of a circuit breaker box with which the switch 36 is intended to be used. As mentioned above, multiple individual circuit transfer switches 36 may be incorporated into a single circuit breaker box or electrical panel such that each individual circuit transfer switch 36 is connected in one of the circuits or loads intended to be powered. Referring to FIGS. 1 and 2, each individual transfer switch 36 is configured to be conductively connected to a first power source, such as utility power U, a load L, and a secondary power source, such as generator 14. Each individual circuit transfer switch 36 includes conventional electrical overload protection, and can include arc-fault and/or ground fault circuit protection in a manner as is known is the art.

The individual circuit transfer switch 36 includes a stab 70 which is constructed and configured to connect the switch 36 to a first external power source, such as utility power, in a manner as is known. The location of the stab 70 may vary as desired, but in the representative embodiment, the stab 70 is located on a rearward facing wall 72 of switch 36. It is understood, however, that the switch 36 may be connected to utility power in any other satisfactory manner, and is not limited to a stab-type connection as shown. Representatively, stab 70 is constructed and configured to tool-lessly electrically connect switch 36 to bus 32 of main panel 12.

The individual circuit transfer switch 36 further includes a pair of connectors, such as a first terminal 74 and a second terminal 76. The terminals 74, 76 may be located on the end of the switch 36 that is opposite the stab 70, though the location of the terminals 74, 76 may vary as desired. One of the terminals, e.g., terminal 74, is adapted for connection to a second external power source, such as a generator 14, via one of conductors 58, 64, 66 associated with one of bars 16, 18 of distribution panel 10. The other terminal, e.g., terminal 76, is connected in one of the electrical circuits or loads 42, 44, 46 associated with power distribution system 8. While the individual circuit transfer switch 36 is illustrated as being connected to the generator and the electrical circuit via terminal-type connections, it is understood that the switch 36 may be connected to the generator and the electrical circuit in any other satisfactory manner although no switching mechanism is necessary between generator 14 and the respective switch 36, 38, 40.

The individual circuit transfer switch 36 also includes a switch assembly 78 that operably switches the electrical connection of the corresponding load 42, 44, 46 discretely or in an electrically isolated manner between the first or utility and second or auxiliary power sources to provide power to the respective load to which the switch 36 is connected. The switch assembly 78 includes a first switch 80 that corresponds with the first power source and a second switch 82 that corresponds with the second power source. The individual circuit transfer switch 36 includes a conductor that is connected between stab 70 and first switch 80 and another conductor connected between the first switch 80 and the load terminal 76 such that utility power can be communicated through switch assembly 78 when first switch 80 is in an "ON" or conducting condition. Switch assembly 78 includes another conductor that is connected between second switch 82 and auxiliary input power terminal 74 and another conductor between second switch 82 and load terminal 76. Thus, when the first switch 80 is in a first position, e.g., the "ON" position, power flows from the first power source associated with stab 70, through first switch 80, and therefrom to load terminal 76 such that utility power can be utilized for operation of the respective load. When the first switch 80 is in a second position, e.g., the "OFF" position, the connection between the utility power and the load is broken so that power cannot be supplied from stab 70 to load terminal 76.

The position of the second switch 82 correlates oppositely with the position of the first switch 80 in the following manner. Specifically, when the first switch 80 is in the ON position, the second switch 82 is in the OFF position, whereby the connection with auxiliary power terminal 74 is broken so that the second or auxiliary power source at terminal 14 is not connected to terminal 76. Conversely, when the first switch 80 is in the OFF position, the second switch 82 can be positioned in the ON position, whereby power from the secondary or auxiliary power source communicated to terminal 74 can be communicated to load terminal 76 via the conductive path associated with the operation of second switch 82, thereby electrically connecting auxiliary power input or terminal 74 and to the circuit or load associated with terminal 76.

In order to control the positions of the switches 80, 82 to ensure that switches 80, 82 cannot both attain the ON position at the same time, the switch assembly 78 includes an interlock 86. The interlock 86 may be any physical, mechanical, electro-mechanical or electrical structure or system that maintains the above-described relationship between the conducting or ON and non-conducting or OFF orientations of switches 80, 82 to ensure the switches 80, 82 cannot both be in the ON position at any given time. Thus, during operation, the interlock 86 may be configured to prevent movement of switch 80 from the OFF position to the ON position while switch 82 is in the ON position, and vice versa. Alternatively, interlock 86 may be configured to physically move switch 82 from the OFF position to the ON position when a user moves switch 80 from the ON position to the OFF position, and vice versa. This prevents the undesirable result of having both of the switches 80, 82 in the ON position at the same time, which could potentially allow power to flow from the second power source, e.g., generator 14, into the utility power grid and vice versa.

FIGS. 2-4 illustrate one embodiment of an individual circuit transfer switch 36 usable with the distribution panel system of the present invention. This embodiment may be referred to as a "triple motion mechanism" switch. As shown in FIGS. 2-4, the interlock 86 is in the form of a stop that is slidably attached to a housing 88 of switch 36. When the interlock 86 is in the first position adjacent the handle of switch 80, it prevents switch 86 from being moved into the ON position. Thus, switch 80 must be in the OFF position when the interlock 86 is in the first position. In order to move switch 80 from the OFF position to the ON position, the interlock 86 must be moved out of the way, e.g., it must slide along a track 90 (FIG. 3). However, when switch 82 is in the ON position, the handle of switch 82 prevents the interlock 86 from sliding along the track 90. Accordingly, switch 82 must be moved to the OFF position before the interlock 86 can be moved to a second position.

Referring to FIG. 4, as compared to the FIGS. 2 and 3, once switch 82 is moved to the OFF position, the interlock 86 may be moved along track 90 so as to be positioned adjacent to the handle of switch 82, which allows the handle of switch 80 to be moved so as to place switch 80 in the ON position. When in the second position, the interlock 86 prevents the handle of switch 82 from being moved to a position in which switch 82 is ON. Thus, the configuration of individual circuit transfer switch 36 as shown in FIGS. 2-4 prevents both switches 80 and 82 from being in the ON position at the same time. Moreover, the above description illustrates the basis for the name of this configuration, i.e., "a triple motion mechanism" switch. More specifically, switching the power source that is electrically connected to the load associated with terminal 76 requires three movements: (1) moving one of the handles of switches 80, 82 from the ON position to the OFF position; (2) sliding the interlock 86 to a position in which it is adjacent the handle of the switch that was most recently turned to the OFF position; and (3) moving the handle of the other one of the switches 80, 82 from the OFF position to the ON position thereby effectively switching the source of an input power delivered to a load from a first source, such as a utility, to a second source, such as an electrical generator, and vice versa, and in a manner that maintains electrical isolation between the respective source and in a manner that does not require user interaction with the distribution panel disposed between the auxiliary power source and the main or utility panel.

As alluded to above, the specific construction of switch 36 described above is merely exemplary of one such transfer breaker usable with the distribution panel system according to the present invention. Other transfer breaker constructions and methods of operation are more fully disclosed in Applicant's copending U.S. patent application Ser. No. 13/273, 955. Regardless of the specific construction of transfer breaker 36, it is appreciated that the switches, breakers or transfer switch breakers intended to provide the connectively between a load and multiple power sources are capable of not only providing conventional overload protection but also selectively connecting its loads to either the utility power supply or the auxiliary power supply, e.g., electric generator. The distribution panel of the present invention is designed to facilitate the electrical connection of these transfer breakers to the auxiliary power supply. Because the transfer breakers described in the above-referenced application provide a simpler auxiliary power management system, the present invention augments that simplification with a new distribution panel construction.

Referring back to FIG. 1, each of transfer breakers 36, 38, and 40 are capable of feeding power to the loads 42, 44, and 46, respectively, from either the utility power supply or the electric generator 14. In this regard, the transfer breakers 36, 38, 40 are hardwired to main panel electrical bus 32 and to at least one of distribution panel bus(es) 16, 18. In the illustrated example, transfer breaker 36 has a utility power input 56 that is connected to electrical bus 32 and an auxiliary power input 58 that is connected to receive electrical power from the electrical generator 14 through electrical bus 18. Transfer breakers 38, 40, on the other hand, have utility power inputs 60, 62, respectively, that are connected to the main panel electrical bus 32 and to auxiliary power inputs 64, 66, respectively, that are connected to distribution panel electrical bus 16. In this regard, when utility power is unavailable, load 42 is fed electrical power from the generator 14 through bus 18 yet loads 44, 46 are fed electrical power from the generator 14 though bus 16. It will be appreciated that the invention is not limited to the number and arrangement of loads illustrated in FIG. 1. That is, it is appreciated that one or loads may be connected to electrical bus 18 and one or more loads may be connected to electrical bus 16. It is further appreciated that only one load can be connected to either of electrical buses 16, 18 when the situation only requires powering of one such auxiliary load.

Regardless of their position relative to either of distribution panel 10 and/or main panel 12 as described above, FIG. 5 shows an exemplary embodiment of one or more of bus(es) 16, 18. It is appreciated that one or more of buses 16, 18 can be provided in a more conventional configuration commonly associated with bus bar constructions. Such bus bars have for an extended time included a number of threaded fasteners or set screws that cooperate to overlie a conductor passage such that tightening of the fastener or set screw ensures a sound mechanical and electrical interaction between the respective conductors and the corresponding bar. More recently, multiple conductor tool-less electrical connections have become popular as providing satisfactory mechanical and electrical connections between two or more conductors and in a manner that can be quickly implemented. It is envisioned that bus(es) 16, 18 could be provided in either such configuration but are preferably provided in a manner that satisfies customer expectations of use and cost.

Figure 5:
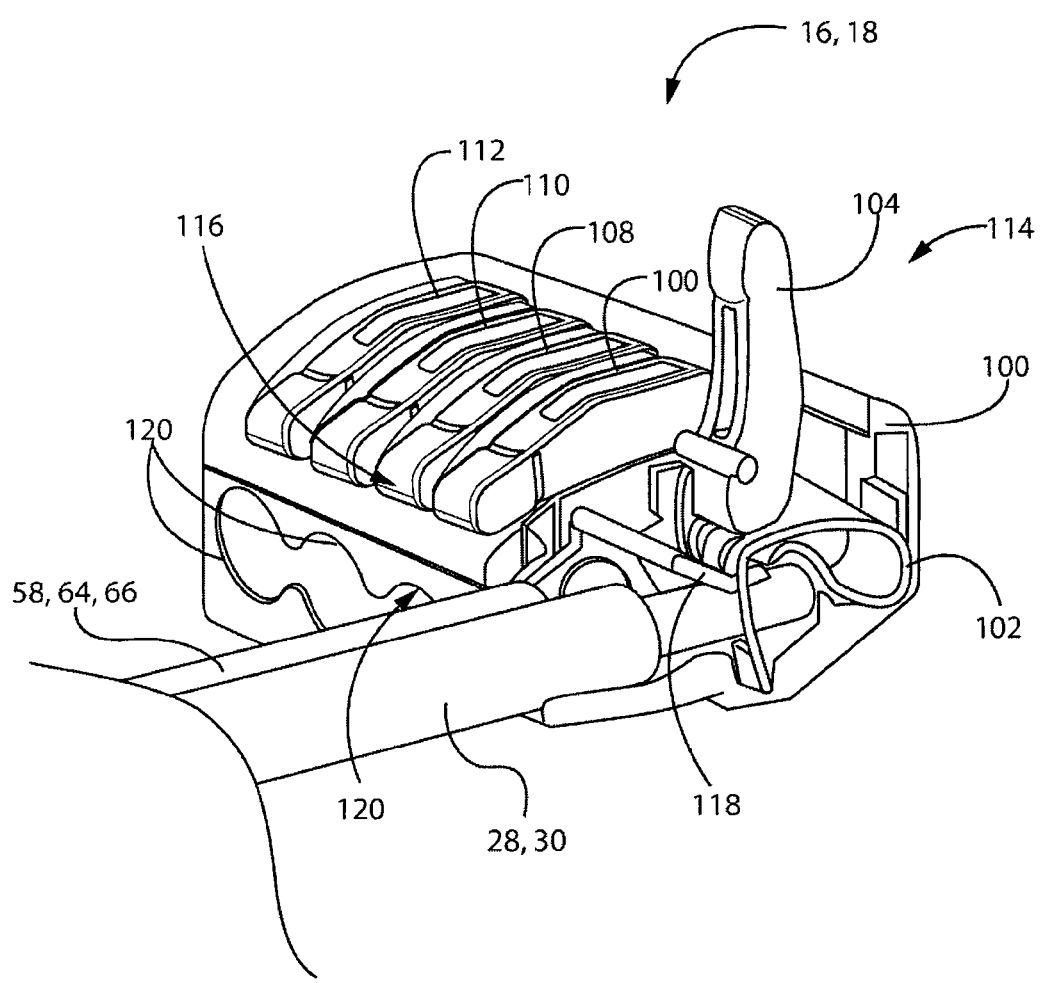
FIG. 5 is an isometric view of an exemplary bus bar associated with at least the distribution panel shown diagrammatically in FIG. 1.

As shown in FIG. 5, bus 16, 18, includes a body 100 that is preferably constructed of a non-conductive material. A spring member 102 is generally surrounded by and extends along the length longitudinal length of body 100. Spring member 102 is preferably constructed of conductive material. At least two levers 104, 106, 108, 110, 112 are pivotably associated with body 100 so as to be movable between an unclamped position 114 and a clamped position 116. When in the unclamped position 114, longitudinal displacement of a respective conductor 28, 30, 58, 64, 66 into a respective conductor opening 120 defined by body 100 allows the respective conductor to be placed in conductive association with one or more of spring member 102 and a clamp member 118 associated with a respective opening 120. Preferably, spring member and clamp member are configured to cooperate with a respective conductor such that, when the respective conductor is pushed into the corresponding opening 120, the position of the conductor can be loosely retained before the corresponding lever is transitioned to the clamped position 116.

Once positioned relative to body 100 and spring member 102, a corresponding lever 104, 106, 108, 110, 112 can be rotated toward the clamped position 116 thereby biasing spring member 102 and/or clamp member 118 into compression about the corresponding conductor 28, 30, 58, 64, 66.

When the respective lever 104, 106, 108, 110, 112 is in the clamped position 116, the corresponding conductor 28, 30, 58, 64, 66 is mechanically and electrically secured to the corresponding respective bus 16, 18. Preferably, levers 104, 106, 108, 110, 112 closely cooperate with body 100 when in clamped position 116 thereby providing a fairly compact form factor when all of the desired conductors 28, 30, 58, 64, 66 are associated with the respective bus 16, 18 and all of the levers 104, 106, 108, 110, 112 are in clamped position 116. It is appreciated that the interaction of each conductor with the respective bus 16, 18 can be conveniently manipulated without interfering with the cooperation of any of the other conductors 28, 30, 58, 64, 66 and the respective bus 16, 18 via user interaction with only the corresponding lever 104, 106, 108, 110, 112 associated with a given conductor. Such a configuration allows expeditious configuration and re-configuration of either of bus(es) 16, 18 to satisfy changing demands associated with an intended application of distribution panel 10.

It is further appreciated that body 100 can include a tang associated with securing the body 100 of the respective bus 16, 18 to the housing associated with distribution panel 10 and/or main panel 12. It is further appreciated that such a tang may include a passage associated with receiving a fastener that engages the corresponding housing in a manner that maintains electrical isolation of the spring member 100, the clamp member 118, and the corresponding conductors 28, 30, 58, 64, 66 and the housing associated with the respective panel. Such a construction allows a user to manipulate levers 104, 106, 108, 110, 112 without direct user interaction with body 100 of the respective bus 100, 102.

Although the present invention has been described and shown as a stand-alone distribution panel for use with a main panel, it is further appreciated that the components of the distribution panel could be installed in the main panel to provide a single panel capable of providing the functionality described above. In this regard, it is contemplated that the present invention could be commercially available as a ready-to-install combined main/auxiliary power distribution panel or as a kit that allows a homeowner or electrician to install the distribution panel in cooperation with a pre-existing or separately purchased main panel.

The invention has been described with respect to a distribution panel for use with an auxiliary power supply, such as an electrical generator. The present invention however is not limited to such an auxiliary power supply. Moreover, the distribution panel may be used with different types of electrical generators. For example, FIG. 1 shows the distribution panel according to one embodiment of the invention for use with a 125/250V electrical generator. It is contemplated however that the invention could be used with other electrical generators, such as a 125V electrical generator. As known in the art, a 125V electrical generator has only "hot" output. It is therefore contemplated that the distribution panel could have one electrical bus, e.g., electrical bus 16 or 18, rather than two electrical buses. It is also contemplated that the dual electrical bus embodiment described above and shown schematically in FIG. 1 could be used with an auxiliary power supply that provides a single "hot" electrical output. For such an implementation, one of the electrical buses of the auxiliary distribution panel would not be connected to the auxiliary power supply or a transfer breaker of the main distribution panel or the kit may omit the second electrical bus as being unnecessary relative to an intended use of the distribution panel.

Therefore, one embodiment of the invention includes an electrical power distribution apparatus that is configured to selectively communicate power from alternate power sources to one or more loads in a manner that maintains isolation of the input power derived from the alternate sources. The electrical power distribution apparatus includes a neutral input for connecting to a neutral output of the auxiliary power supply and a ground conductor for connecting a ground conductor of the auxiliary power supply. The apparatus includes an electrical bus that receives electrical power from a first electrical output of the auxiliary power supply and unswitchably communicates the first electrical output to a breaker connected to a load.

Another embodiment that is useable with one or more of the features of the above present invention includes an electrical power distribution apparatus for connecting a load to one of a utility power supply and an auxiliary power supply and includes a neutral input for connecting to a neutral output of an auxiliary power supply. The power distribution apparatus includes a ground conductor for connecting a ground conductor of the auxiliary power supply and an electrical bus for receiving electrical power from a first electrical output of the auxiliary power supply and unswitchably communicating the first electrical output to a breaker connected to a load.

A further embodiment usable in combination with any of the above embodiments includes a distribution panel for communicating power between a utility power source and an auxiliary power source and at least one load. The distribution panel includes an electrical power input for receiving electrical power from a utility power supply and a main electrical bus connected to the electrical power input. An auxiliary electrical bus receives electrical power from an auxiliary power supply and a ground conductor that connects a ground associated with the auxiliary power supply and a ground associated with the distribution panel. At least one transfer breaker has a first input that is connected to the main electrical bus and a second input that is connected to the auxiliary electrical bus. The distribution panel includes a power output that is connectable to an electrical load and means for selectively connecting the power output to either the first input or the second input.

Another embodiment useable in combination with any of the above embodiments includes a kit for retrofitting a main electrical panel to selectively communicate power to a load from one of a utility power supply and an auxiliary power supply. The kit includes a first electrical bus for receiving electrical power from a first electrical output of the auxiliary power supply and a second electrical bus for receiving electrical power from a second electrical output of the auxiliary supply. Each of the first electrical bus and the second electrical bus are unswitchably connectable to a breaker associated with the main electrical panel and each breaker is independently connectable to the utility power supply. The kit includes a neutral input for connecting to a neutral output of the auxiliary power supply and a ground conductor for connecting to a ground conductor of the auxiliary power supply.

Another embodiment of the invention that can be combined with one or more of the above embodiments includes an electrical power distribution apparatus for use with an auxiliary power supply. The apparatus includes a first electrical bus for receiving electrical power from a first electrical output of the auxiliary power supply and a second electrical bus for receiving electrical power from a second electrical output of the auxiliary power supply. The first and second electrical buses are configured to unswitchably communicate electrical power to a breaker connected to both a load and to utility power. The apparatus includes a neutral input for connecting to a neutral output of the auxiliary power supply and a ground conductor for connecting to a ground conductor of the auxiliary power supply.

The present invention has been described in terms of representative embodiments, and it is recognized that equivalents, alternatives, and modifications, aside from those expressly stated, are possible and within the scope of the appending claims. It should be further understood that the invention is not limited in its application to the details of construction and arrangements of the components set forth herein. The invention is capable of other embodiments and of being practiced or carried out in various ways. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

I claim:

1. An electrical power distribution apparatus for connecting a plurality of loads to one of a utility power supply and an auxiliary power supply, the electrical power distribution apparatus comprising:
   a neutral conductor operable to be electrically connected to a neutral wire of an auxiliary power supply;
   a ground conductor operable to be electrically connected to a ground wire of the auxiliary power supply;
   an electrical bus for receiving electrical power from the utility power supply; and
   a plurality of individual circuit transfer switches, wherein each individual circuit transfer switch includes:
      a first terminal operable to electrically connect the individual circuit transfer switch to the electrical bus;
      a second terminal operable to electrically connect the individual circuit transfer switch to a power conductor from the auxiliary power supply;
      an output operable to be electrically connected to one of the plurality of loads, each of the plurality of loads is connected to a separate individual circuit transfer switch, and
      a switch assembly operable to selectively connect one of the first terminal and the second terminal to the output.

2. The electrical power distribution apparatus of claim 1 wherein the neutral conductor includes a neutral bus.

3. The electrical power distribution apparatus of claim 1 wherein:
   the power conductor from the auxiliary power supply is a first power conductor, and
   the second terminal of at least one of the plurality of individual circuit transfer switches is operable to be electrically connected to a second power conductor for receiving electrical power from the auxiliary power supply.

4. The electrical power distribution apparatus of claim 1 further comprising:
   an auxiliary panel including:
      the neutral conductor operable to be electrically connected to the neutral wire of the auxiliary power supply;
      the ground conductor operable to be electrically connected to the ground wire of the auxiliary power supply;
      an electrical bus for receiving electrical power from the auxiliary power supply;
   a main distribution panel, including:
      the electrical bus for receiving electrical power from the utility power supply, and the plurality of individual circuit transfer switches; and
a plurality of conductors, wherein:
each conductor electrically connects the electrical bus in the auxiliary panel to the second terminal of one of the plurality of individual circuit transfer switches, and wherein
the auxiliary panel is incapable of selectively switching power between the auxiliary power supply and the main distribution panel.

5. The electrical power distribution apparatus of claim 1 wherein the auxiliary power supply is an electrical generator.

6. The electrical power distribution apparatus of claim 5 wherein the electrical generator is one of a 125V or a 125/250V electrical generator.

7. The electrical power distribution apparatus of claim 1 wherein each individual circuit transfer switch further includes an overload protection device operable to prevent current in excess of a predefined value from being provided to the output from either the utility power supply or the auxiliary power supply.

8. The electrical power distribution apparatus of claim 1 further comprising a main panel having a plurality of slots, wherein each slot is configured to receive either a conventional circuit breaker or one of the plurality of individual circuit transfer switches.

9. A distribution arrangement for communicating power between either a utility power source or an auxiliary power source and a plurality of loads, the distribution arrangement comprising:
an electrical power input for receiving electrical power from the utility power supply;
a main electrical bus connected to the electrical power input;
a ground bus operable to be electrically connected to a ground wire associated with the auxiliary power supply; and
a plurality of individual circuit transfer switches having a first input connected to the main electrical bus, a second input connected to the auxiliary power source, a power output connectable to one of the plurality of loads, and means for selectively connecting the power output to either the first input or the second input.

10. The distribution arrangement of claim 9 further comprising:
an auxiliary panel including an auxiliary electrical bus for receiving power from the auxiliary power supply;
a main distribution panel, including the electrical power input, the main electrical bus, and the plurality of individual circuit transfer switches; and
a plurality of conductors, wherein each conductor electrically connects the auxiliary electrical bus to the second input of one of the plurality of individual circuit transfer switches, and wherein electrical power between the auxiliary power supply and each individual circuit transfer switch is non-interruptible in the auxiliary panel during operation of the auxiliary power supply.

11. The distribution arrangement of claim 9 wherein:
the auxiliary power supply includes a first hot output and a second hot output,
the second input of a first individual circuit transfer switch, selected from the plurality of individual circuit transfer switches, is connected to the first hot output to receive electrical power from the auxiliary power supply, and
the second input of a second individual circuit transfer switch, selected from the plurality of individual circuit transfer switches, is connected to the second hot output to receive electrical power from the auxiliary power supply.

12. The distribution arrangement of claim 9 wherein each individual circuit transfer switch further includes an overload protection device operable to prevent current in excess of a predefined value from being provided to the power output from either the utility power supply or the auxiliary power supply.

13. The distribution arrangement of claim 9 further comprising a panel having a plurality of slots, wherein each slot is configured to receive either a conventional circuit breaker or one of the plurality of individual circuit transfer switches.

14. A kit for retrofitting a main electrical panel to selectively communicate power to a load from one of a utility power supply and an auxiliary power supply; the kit comprising:
at least one individual circuit transfer switch, wherein each individual circuit transfer switch includes:
a first terminal operable to electrically connect the individual circuit transfer switch to an electrical bus of the main electrical panel, wherein the electrical bus is electrically connected to the utility power supply;
a second terminal operable to electrically connect the individual circuit transfer switch to a power conductor from the auxiliary power supply;
an output operable to be electrically connected to the load, wherein the load is an individual circuit selected from a plurality of circuits receiving power from the main electrical panel, and
a switch operable to selectively connect one of the first terminal and the second terminal to the output.

15. The kit of claim 14, wherein each switch is configured to cooperate with at least one of the first input and the second input in a tool-less manner.

16. The kit of claim 14 wherein each individual circuit transfer switch further includes an overload protection device operable to prevent current in excess of a predefined value from being provided to the output from either the utility power supply or the auxiliary power supply.

17. The kit of claim 14 wherein the main electrical panel further includes a panel having a plurality of slots, wherein each slot is configured to receive either a conventional circuit breaker or the at least one individual circuit transfer switch.

* * * * *

UNITED STATES PATENT AND TRADEMARK OFFICE
CERTIFICATE OF CORRECTION

| | | |
|---|---|---|
| PATENT NO. | : 9,343,925 B1 | Page 1 of 1 |
| APPLICATION NO. | : 13/587281 | |
| DATED | : May 17, 2016 | |
| INVENTOR(S) | : Michael O. Flegel | |

It is certified that error appears in the above-identified patent and that said Letters Patent is hereby corrected as shown below:

IN THE CLAIMS

CLAIM 1, column 12, line 37, after "loads," insert -- wherein --.

Signed and Sealed this
Ninth Day of August, 2016

Michelle K. Lee
*Director of the United States Patent and Trademark Office*